United States Patent [19]

Morel

[11] Patent Number: 5,420,084
[45] Date of Patent: May 30, 1995

[54] COATINGS FOR PROTECTING MATERIALS AGAINST REACTIONS WITH ATMOSPHERE AT HIGH TEMPERATURES

[75] Inventor: Bertrand Morel, Moirans, France

[73] Assignee: Pechiney Recherche, Courbevoie, France

[21] Appl. No.: 181,037

[22] Filed: Jan. 14, 1994

[30] Foreign Application Priority Data

Jan. 28, 1993 [FR] France ............... 93 01258

[51] Int. Cl.$^6$ ............... C04B 35/16; C04B 35/58; B32B 18/00
[52] U.S. Cl. ............... 501/96; 501/92; 501/154; 427/201; 427/202; 427/204; 427/205; 428/408; 428/689; 428/698
[58] Field of Search ............... 501/92, 96, 154; 427/201, 202, 204, 205; 428/408, 689, 698

[56] References Cited

U.S. PATENT DOCUMENTS

| | | | |
|---|---|---|---|
| 4,308,114 | 12/1981 | Das et al. | 204/67 |
| 4,588,700 | 5/1986 | Reven | 501/31 |
| 4,795,677 | 1/1989 | Gray | 428/246 |
| 5,091,222 | 2/1992 | Nishio et al. | 427/335 |
| 5,234,507 | 8/1993 | Sato et al. | 148/28 |
| 5,258,334 | 11/1993 | Lantz, II | 437/238 |
| 5,310,476 | 5/1994 | Sekhar et al. | 427/212 |
| 5,330,789 | 7/1994 | Booth et al. | 427/189 |

FOREIGN PATENT DOCUMENTS

| | | |
|---|---|---|
| 466491 | 1/1992 | European Pat. Off. . |
| WO8803519 | 5/1988 | WIPO . |

OTHER PUBLICATIONS

Japan Abstract JP 54 092 271 (Derwent, London, GB) (Canon KK) Jul. 1979.
Japan Abstract JP 2 111 679 (Derwent, London, GB) (Tokai Carbon KK) Apr. 1990.
Patent Abstracts of Japan, vol. 014, No. 439, 1990, Aug. JP A-21 72 860 (Toshiba Ceramics Co).

*Primary Examiner*—Mark L. Bell
*Assistant Examiner*—David Sample
*Attorney, Agent, or Firm*—Dennison, Meserole, Pollack & Scheiner

[57] ABSTRACT

The invention relates to a coating for protecting materials against reactions with atmosphere at high temperatures. The coating according to the invention comprises a mixture of zirconium diboride and colloidal silica, advantageously with various additives such as silicon carbide. The coating according to the invention can, for example, efficiently protect carbon and graphite up to 1350° C.

12 Claims, No Drawings

COATINGS FOR PROTECTING MATERIALS AGAINST REACTIONS WITH ATMOSPHERE AT HIGH TEMPERATURES

THE TECHNICAL SECTOR

The invention relates to coatings for protecting materials against reactions with atmosphere at high temperatures. More particularly, it relates to compositions based on zirconium diboride and of use for protecting numerous materials, particularly graphite and carbon, up to 1350° C.

THE STATE OF THE ART

Many materials have the disadvantage of reacting with the atmosphere, thus limiting or preventing their use at high temperature, e.g. in the case of carbon or graphite. These materials oxidise very quickly at 500° C., forming carbon dioxide. Oxidation considerably shortens the service life of crucibles, electrodes or other components made of graphite or carbon and used at high temperature.

Many protective coatings have been developed for protecting materials against reaction with atmosphere at high temperatures. Depending on their mechanism of action, the prior-art coatings can be divided into two main groups.

The first group contains coatings for inhibiting the oxidation reaction by poisoning the active sites. These coatings, which have long been known, are very often based on phosphates or borates. Simple treatment with phosphoric acid, for example, can delay oxidation of graphite by about 200° C. Other such compositions are disclosed in U.S. Pat. No. 1,948,382 and FR-PS 1 446 038. The improvement made by coatings of this kind is real and effectively protects components up to about 800° C., but is not effective above this temperature.

The second group consists of coatings which, instead of inhibiting the oxidation sites, form a barrier against oxygen. Very often, these coatings are based on silica (or products such as silicon and silicon carbide which oxidise to silica), which have the property of low diffusion of oxygen at high temperature. The compositions disclosed by U.S. Pat. No. 3,164,489 and JP-PS 60155587 are of this kind. The disadvantage of oxygen barrier-type coatings is that they have micro-cracks owing to thermal shocks and differences in the coefficient of expansion. The micro-cracks, even when small, e.g. 100 Å, result in oxidation points which rapidly spread to the entire underlying substrate, even when the coating appears to be in a good state.

The best prior-art compromises are in coatings which combine both mechanisms of protection. These are oxygen barrier-type coatings, but the cracks are sealed by a silica-type and/or inhibitor-type liquid phase.

U.S. Pat. No. 4,711,666, for example, discloses a composition comprising silicon carbide, phosphates and silica. Patent application WO 88/03519 discloses a composition comprising titanium diboride and a silica compound, optionally with addition of a metal salt. These compositions are much more efficient than the compositions in the previously-mentioned groups and can effectively protect material up to 1000° C. Above this temperature, the efficiency of protection decreases very rapidly. At 1300° C., protection is completely ineffective and the substrate becomes completely oxidised, with or without a coating.

The aim of the applicants has been to develop a coating which efficiently protects materials against reaction with atmosphere up to at least 1350° C.

DESCRIPTION OF THE INVENTION

The invention relates to a coating for protecting materials against reactions with atmosphere at high temperatures, characterised in that the coating contains zirconium diboride and colloidal silica. Preferably, the ratio by weight of zirconium diboride to colloidal silica is between 1 and 9.

The coating according to the invention is usually deposited directly on to the substrate to be protected. In some cases, however, to improve the adhesion of the coating to the substrate, it is preferable first to deposit an adhesive underlayer on the substrate. Advantageously the underlayer is made of products which are adhesive and simultaneously participate in protection, e.g. by inhibition of oxidation. This double purpose is served in particular by a deposit based on zinc phosphate or aluminium phosphate.

The coating according to the invention is made from commercial zirconium diboride without any special requirement regarding impurities. Normally use is made of a fine powder, preferably having a particle size of 10 to 40 microns. The colloidal silica is intimately mixed with the diboride.

The coating according to the invention can be applied to the substrate by all means conventionally used for similar products, e.g. by brush, spatula or sprayer. Protection of course increases with the thickness of the coating. Very good results are obtained at or above 35 mg/cm$^2$.

The coating according to the invention vitrifies between 600 and 700° C. To obtain efficient protection, vitrification must be rapid. If the coated component must itself be raised to a high temperature very quickly (>300°/h), the coating will be vitrified under good conditions during actual use of the component. If on the other hand the coated component has to undergo a slow rise in temperature, vitrification pretreatment will be necessary, advantageously by using a blowpipe. This method of heat-treatment results in a deposit of non-uniform thickness. Glass forms only at the surface, leaving a non-bonded layer between the surface and the substrate. The layer absorbs differences in the coefficient of expansion when the component is subjected to thermal shocks. Typical pretreatment consists in raising the temperature at 300 °C./hour up to 1000° C., holding at 1000° C. for 15 minutes and cooling in atmosphere. After cooling, the component is available for its intended use.

The performances of the coating according to the invention are due to the surprising properties of zirconium diboride in combination with colloidal silica. Numerous tests made with titanium diboride in combination with colloidal silica as per the prior art have shown that the coating loses efficiency above 1000° C. and becomes completely ineffective at 1300° C. This loss of efficiency at high temperature is due to an excessively high conversion rate of titanium diboride to oxide. Conversion to oxide lowers the melting point of the glass and modifies the expansion coefficient of the deposit, which adversely affects the protection. To improve the performance of the prior-art combination at very high temperatures, therefore, the skilled man needs to replace titanium diboride by another boride which becomes less oxidised at high temperatures.

A large number of borides have already been used in combination with other products in protective coatings, e.g. nickel, chromium, lanthanum and calcium boride and zirconium diboride. The skilled man, searching among all these borides for a boride which becomes less oxidised than titanium diboride, will immediately reject zirconium diboride since, as shown in Table 1, zirconium diboride oxidises even more easily than titanium diboride in air at a temperature of 1200° C.

TABLE 1

| | Conversion rate of borides to oxides | | |
|---|---|---|---|
| | 800° | 1000° | 1200° |
| $ZrB_2$ | 35% | 59% | 65% |
| $TiB_2$ | 40% | 58% | 61% |

The excellent results nevertheless obtained by replacing titanium diboride with zirconium diboride are due to an unexpected phenomenon. The oxidation rates of the two diborides at high temperature are very close when they are tested separately, but the same diborides, when associated with colloidal silica, behave in entirely different ways in atmosphere at high temperature. When associated with colloidal silica, zirconium diboride oxidises four times as slowly as titanium diboride. Table 2 shows the percentages of boride converted to oxide after five hours at 1200° C. in the case of two coatings, i.e. a prior-art coating consisting of 45% $TiB_2$, 25% $SiO_2$ and 30% SiC and a coating according to the invention consisting of 45% $ZrB_2$, 25% $SiO_2$ and 30% SiC.

TABLE 2

| | Percentage conversion to oxide | |
|---|---|---|
| | Direct rise to 1200° C. | Rise with plateau at 1000° C. for 15 minutes |
| $TiB_2$ | 15% | 28% |
| $ZrB_2$ | 4% | 6% |

The surprising response to oxidation of zirconium diboride, when combined with colloidal silica, does not occur when zirconium diboride is combined with other silica compounds. Numerous tests made with silica vapour or powdered silica were completely negative. Colloidal silica, for an at present unexplained reason, is the only substance which limits oxidation of zirconium diboride and consequently gives the coating according to the invention a much better protective power than prior-art coatings.

The coating according to the invention also has surprising properties with regard to adhesion to the substrate. Comparative tests were made with prior-art coatings (based on titanium diboride) and coatings according to the invention (based on zirconium diboride). The test consisted in sticking two graphite test-pieces with the deposit under study and measuring the resistance to pulling off after annealing. The prior-art coatings give results around 2 MPa, whereas the coatings according to the invention reach up to 6.7 MPa. This three-fold improvement in an essential property of the coatings has not as yet been explained.

In addition to the original mixture of zirconium diboride and colloidal silica, the coating according to the invention can contain additives for modifying the physical properties of the overall coating. To improve results, for example, it is desirable to modify the expansion coefficient of the coating in one or the other direction, depending on the nature of the substrate to be protected. Similarly, the flow properties of the coating can be modified by an additive, to improve the adaptation of the component to the manner of use (e.g. by brush or sprayer). More prosaically, it may be advantageous to reduce the cost of the coating by adding an inert filler, which is much less expensive.

The additives were chosen from among products with little or no effect on the main or central feature of the invention, i.e. vitrification of the mixture of zirconium diboride and colloidal silica. Addition of fluxes, such as boron oxide or alkali-metal silicates, is inadvisable since they lower the melting-point of the glass. A wide range of additives can be used, e.g. alumina, powdered silica or boron nitride. Silicon carbide is one of the most frequently-used additives. It has the advantage of being considerably less expensive than zirconium diboride. Its expansion coefficient is near that of graphite. It has the advantage of increasing the resistance of the coating to abrasion, but the amount added must be limited to 40% of the total weight. Above 40%, the porosity of the coating increases, with a corresponding reduction in performance.

With or without additives, deposited directly or on an underlayer, the coating according to the invention gives efficient protection of most materials (metals, ceramics, composites, graphite, carbon, etc) up to 1350° C.

EXAMPLE 1

Ten graphite test-pieces 25 mm in diameter and 30 mm high, with filed edges, were prepared. The graphite was ordinary-grade graphite having an expansion coefficient of $3 \times 10^{-6}$/°C. All the test-pieces were first degreased with acetone.

Five test-pieces were coated, using a brush, with a deposit consisting of a composition according to the invention and containing 45% zirconium diboride, 25% colloidal silica and 30% silicon carbide. The other five test-pieces were coated, using a brush, with a deposit consisting of a prior-art composition and containing 45% titanium diborate, 25% colloidal silica and 30% silicon carbide.

The two sets of coated test-pieces were first dried in an oven at 120° C. for 15 minutes after receiving a first layer, then dried a second time under the same conditions after receiving a second layer. The total coating on each of the ten test-pieces corresponded to a thickness of 60 mg/cm².

After being coated, the ten test-pieces were pretreated by direct heating to 1000° C. at the rate of 300° C. per hour, holding at 1000° C. for 15 minutes, and cooling in atmosphere.

Each test-piece was weighed, and the ten test-pieces were treated at 1000° C. for 5 hours, with scavenging of air. After cooling, the test-pieces were examined and weighed. All the test-pieces were in perfect condition and showed no damage or loss of weight.

The same test-pieces were re-inserted into the furnace and subjected to a second thermal cycle and held at 1350° C. for 5 hours. After cooling, it was found that the five samples coated with the prior-art composition based on titanium diboride all had damaged coatings and a loss of weight varying from 30 to 40%. The five test-pieces coated with the composition according to the invention were undamaged, and their loss of weight was less than 2%.

EXAMPLE 2

Cubic test-pieces (2 cm×2 cm×2 cm) were made from relatively dense graphite, intended for manufacture of crucibles. The expansion coefficient of this graphite was $6\times10^{-6}/°C$.

The ten test-pieces were coated, using a brush, with a composition according to the invention containing 90% zirconium diboride and 10% colloidal silica. The thickness of the coating was 45 mg/cm². The coating was simply dried in an oven and the test-pieces were not given any pretreatment.

The ten test-pieces were subjected to a thermal cycle corresponding to industrial use of the crucibles, i.e. heating to 1200° C. at an average rate of 300° C./per hour, followed by holding at 1200° C. for 10 hours.

After cooling in atmosphere, the test-pieces were examined and weighed. No test-piece had lost more than 2% by weight, and the state of the coating on the test-pieces was excellent in all cases.

EXAMPLE 3

Ten test-pieces made of carbon/carbon composite used for aircraft brakes were prepared in the form of cuboids measuring 4 cm×4 cm×0.5 cm. The carbon/carbon composite had the special feature of different expansion coefficients in different directions, i.e. $1\times10^{-6}/°C$. in the X and Y directions and $8\times10^{-6}/°C$. in the Z direction.

Five test-pieces were coated with two layers of a composition according to the invention, comprising 45% zirconium diboride, 25% colloidal silica and 30% silicon carbide. The total coating corresponded to a thickness of 60 mg/cm².

Five other test-pieces were successively coated with a first layer of zinc phosphate 5 mg/cm² thick and a second layer of the same composition as used for the preceding test-pieces, i.e. comprising 45% zirconium diboride, 25% colloidal silica and 30% silicon carbide. The second layer had a thickness of 40 mg/cm².

The ten coated samples were pre-treated by direct heating to 1000° C. at 300° C./hour, holding at 1000° C. for 15 minutes and cooling in atmosphere.

The ten test-pieces were then inserted in a furnace and treated at 900° C. for five hours, with scavenging of air. At the end of treatment, the ten test-pieces were cooled in atmosphere, examined and weighed.

The five test-pieces without a zinc phosphate underlayer had lost 40 to 50% by weight, even though the coating remained in excellent condition. The coating had simply come unstuck from the substrate and the underlying carbon had oxidised in air.

The five test-pieces comprising a zinc phosphate-based underlayer were intact and the loss of weight was negligible—below 2% in all cases.

I claim:

1. A coating composition for protecting materials against reactions with atmosphere at high temperatures, comprising zirconium diboride and colloidal silica.

2. A coating composition according to claim 1, comprising zirconium diboride and colloidal silica in a weight ratio between 1:1 and 9:1.

3. A coating composition according to claim 1, additionally comprising silicon carbide.

4. A coating composition according to claim 3, wherein said silicon carbide is present in an amount of up to 40% by weight.

5. A coating composition to claim 2, additionally comprising silicon carbide.

6. A method of protecting a material against atmospheric reactions at high temperatures, comprising directly depositing a coating comprising zirconium diboride and colloidal silica onto the material to be protected.

7. A method according to claim 6, additionally comprising vitrifying said coating by heating to a temperature of at least 600°–700° C.

8. A method according to claim 7, wherein said heating takes place with a temperature increase at a rate of at least 300° C./hr.

9. A method of protecting a material against atmospheric reaction at high temperatures, comprising depositing a first layer for facilitating adhesion onto said material and depositing onto said first layer a coating comprising zirconium diboride and colloidal silica.

10. A method according to claim 9, wherein the first layer for facilitating adhesion comprises zinc phosphate or aluminum phosphate.

11. A substrate coated to protect against atmospheric reaction at high temperature, said substrate being coated with a vitrified mixture comprising zirconium diboride and colloidal silica.

12. A substrate coated according to claim 11, wherein said substrate comprises carbon or graphite.

* * * * *